United States Patent [19]

Moore et al.

[11] Patent Number: 5,494,957
[45] Date of Patent: Feb. 27, 1996

[54] STABILIZERS FOR PREPARING POLYMER POLYOLS, AND PROCESS FOR PREPARING POLYMER POLYOLS

[75] Inventors: Douglas R. Moore, Clute; Keith R. Plowman; Paul L. Neill, both of Lake Jackson, all of Tex.

[73] Assignee: The Dow Chemical Company, Midland, Mich.

[21] Appl. No.: 291,786

[22] Filed: Aug. 17, 1994

Related U.S. Application Data

[63] Continuation of Ser. No. 121,003, Sep. 13, 1993, abandoned, which is a continuation-in-part of Ser. No. 689,220, Apr. 22, 1991, abandoned.

[51] Int. Cl.$^6$ .................................................. C08L 51/00
[52] U.S. Cl. .......................... 524/504; 524/760; 524/761
[58] Field of Search .................................... 524/377, 504, 524/760, 761

[56] References Cited

U.S. PATENT DOCUMENTS

| 4,287,323 | 9/1987 | Tefertiller et al. | 525/404 |
| 5,008,325 | 4/1991 | Soto et al. | 524/504 |

FOREIGN PATENT DOCUMENTS

| 262653 | 4/1988 | European Pat. Off. . |

*Primary Examiner*—Jeffrey T. Smith

[57] ABSTRACT

A polymer polyol is prepared by polymerizing one or more ethylenically unsaturated monomers in a polyol. A high molecular weight stabilizer having polymerizable ethylenic unsaturation and a low hydroxyl functionality is used, which leads to improved dispersion stability at reduced stabilizer level.

13 Claims, No Drawings

STABILIZERS FOR PREPARING POLYMER POLYOLS, AND PROCESS FOR PREPARING POLYMER POLYOLS

CROSS-REFERENCE TO RELATED APPLICATION

This is a continuation of application Ser. No. 08/121,003, filed Sep. 13, 1993 now abandoned, which is a continuation-in-part of U.S. application Ser. No. 07/689,220 filed on Apr. 22, 1991 now abandoned.

BACKGROUND OF THE INVENTION

This invention relates to a process for preparing polymer polyols via a vinyl polymerization process.

Polymer polyols are well known products which are used in the preparation of polyurethanes. The polymer polyols of interest herein are polymers of ethylenically unsaturated monomers which are polymerized in situ in a material having a plurality of active hydrogen-containing groups. Such products and processes for their preparation are described, for example, in U.S. Pat. Nos. 4,172,825, 4,233, 425, 4,242,249, 4,287,323, 4,320,221, 4,350,780, 4,390,645, 4,394,491, 4,451,255, 4,460,715, 4,574,137, 4,661,531, 4,689,354, 4,745,153 and RE 32,733.

The most significant technical problem in making polymer polyols is that of forming a stable dispersion of particles having a desired particle size. The polymer particles tend to settle out of the continuous phase or to agglomerate. Often, low molecular weight oligomers form and remain dissolved in the continuous phase. These oligomers greatly increase the viscosity of the polymer polyol.

To alleviate this problem, most processes now employ a "stabilizer" or "dispersant", which according to theory becomes situated on the surface of the polymer particles and makes them more compatible with the continuous polyol phase. This stabilizer material is usually formed from a material such as a polyol which is compatible with the continuous phase, and which has been modified to contain induced unsaturation. The stabilizer is believed to copolymerize with the vinyl monomers so that the resulting polymer contains side chains which are soluble in the continuous phase, and thus help stabilize the particle against agglomeration and settling.

Several types of stabilizers are known, but the most effective ones previously known are or are derived from polyethers which are end-capped to introduce terminal polymerizable unsaturation. These capped polyethers may be homopolymerized or copolymerized with monomers such as styrene and/or acrylonitrile to form the actual stabilizer.

Although good results have been obtained with previous stabilizers, especially in conjunction with other process refinements, further improvements are still desired. Quite often, the stabilizer must be used in rather substantial quantities. Since the stabilizer is prepared from rather expensive raw materials, the use of such large quantities is economically disadvantageous. The stabilizer itself is an additional raw material which must be manufactured and stored, so it is desired for that reason as well to minimize its use. Beyond that, these previously known stabilizers are not as effective as desired. It is still desirable to further improve the stability and particle size distribution of the polymer polyols, or to get equivalent stability using less stabilizer.

In a process for preparing a polymer polyol wherein at least one ethylenically unsaturated monomer is polymerized in the presence of an effective amount of a conventional stabilizer to form a dispersion of particles in the continuous polyol phase and wherein the stabilizer is a partially capped triol, the improvement comprising substituting a more efficient stabilizer for the conventional stabilizer, the more efficient stabilizer being a stabilizer prepared from a formulation including a low molecular weight diol, a coupling agent and a capping agent; and wherein the stabilizer is a polymer having: terminal polymerizable ethylenically unsaturation; an average molecular weight of from about 6,000 to about 100,000; an average hydroxyl functionality of up to about 1.0 hydroxyl groups per molecule; and is present at a from about 0.1 to about 10 percent of the weight of the total polymer polyol.

In addition, the presence of the stabilizer has an effect on the physical properties of polyurethanes made from the polymer polyol. Conventional stabilizers, which often have multiple hydroxyl functionalities would sometimes tend to cause deficiencies in various physical properties, especially fatigue properties. Also, the stabilizer is believed to contribute in some instances to poor compression sets in polyurethane foams.

For these reasons, it would be desirable to provide a stabilizer useful in preparing a polymer polyol, which stabilizer can be used in relatively small quantities and which provides improved stability and/or particle size distribution in the polymer polyol. It would be further desirable to provide a polymer polyol which is useful to prepare polyurethane foams with improved properties relative to polymer polyols made used a conventional stabilizer.

SUMMARY OF THE INVENTION

This invention is a process for preparing a polymer polyol in which at least one ethylenically unsaturated monomer is polymerized in a continuous polyol phase in the presence of an effective amount of a stabilizer to form a dispersion of particles of a polymer of the ethylenically unsaturated monomer in said continuous polyol phase, characterized in that the stabilizer is a polymer having terminal polymerizable ethylenic unsaturation and a number average molecular weight ($M_n$) from about 6000 to about 100,000and which contains an average hydroxyl functionality of up to about 1.0 hydroxyl group/molecule, wherein the stabilizer is present in a concentration of from about 0.1 to about 10 percent of the weight of the polymer polyol,.

With this invention, excellent dispersion stability, particle size distribution and other polymer polyol properties are obtained. In addition, these improvements are seen even when the level of stabilizer is relatively small compared to the amounts used in conventional processes. Thus, this invention provides a means by which improved properties can be obtained at lower cost.

In addition, polyurethane foams prepared according to this invention show improvements in certain physical properties, compared to those foams made using conventional stabilizers.

DETAILED DESCRIPTION OF THE INVENTION

In the process of this invention, a stabilizer is employed which has a low hydroxyl functionality, terminal polymerizable ethylenic unsaturation and a number average molecular weight ($M_n$) in the range of about 6000 to about 100,000.

The $M_n$ is preferably about 8000 to about 50,000, more preferably about 9000 to about 15,000. The stabilizer advantageously has an "overall functionality" which in this context refers to the average number of hydroxyl plus terminal ethylenically unsaturated groups per molecule, of from about 2 to about 6, more preferably about 2 to about 3, more preferably about 2. The stabilizer also has an average hydroxyl functionality of up to about 1.0, preferably less than about 0.8, more preferably less than about 0.7, most preferably less than about 0.6 hydroxyl groups/molecule, as discussed hereinafter.

The stabilizer is advantageously an organic polymer which is compatible with the "base polyol" of the dispersion. The actual composition of the stabilizer, therefore, is usually chosen with that of the base polyol in mind. Since the base polyol in most cases will be a polyester or polyether, the stabilizer is most preferably a polyester or polyether, accordingly. The most preferred base polyol is a polyether, and therefore the most preferred stabilizer is a polyether as well.

Polyether stabilizers are advantageously polymers of one or more cyclic organic oxides. Among these are the alkylene oxides, substituted alkylene oxide, and other polymerizable alicyclic compounds having an ether linkage in the ring, such as tetrahydrofuran. Suitable alkylene oxides include ethylene oxide, propylene oxide, butylene oxide, epichlorohydrin, styrene oxide and other cyclic ethers which are capable of undergoing a ring-opening polymerization to form a polyether. Since the function of the stabilizer is to improve the stability of the dispersed particles in the base polyol, the composition of the stabilizer is advantageously adapted so it is compatible therewith. Thus, the choice of alkylene oxide will typically be made so that the polyether portion of the stabilizer is of a similar makeup as the base polyol. Since, as discussed more fully hereinafter, the preferred base polyol is a polymer of propylene oxide and/or ethylene oxide, the preferred alkylene oxides for use in making the stabilizer are also propylene and/or ethylene oxide. It is more preferred that the stabilizer be a polymer of propylene oxide or a copolymer of propylene oxide and a minor portion of ethylene oxide. The copolymers of propylene oxide may be either random or block copolymers.

As it is sometimes difficult to prepare a good quality polyether of greater than about 2000 equivalent weight, it is often desirable to form the stabilizer of this invention by the coupling of lower equivalent weight polyethers. This process has several advantages. First, it enables one to use polyethers of relatively low equivalent weight as starting materials. These lower equivalent weight polyethers are both less expensive and of superior quality than very high equivalent weight polyethers. In addition, this technique enables one to controllably select the "functionality" of the stabilizer through the selection of the coupling agent and difunctional polyethers. The coupling agent is a material having a plurality of groups which will react with an alcohol to form a covalent bond with the alcohol oxygen. Examples of such groups include isocyanates, carboxylic acids, acid chlorides, epoxies, esters which can undergo an ester exchange reaction, and the like. By selecting a difunctional polyether, the overall functionality of the stabilizer will equal that of the coupling agent. Thus, the coupling of a difunctional polyether with a difunctional coupling agent will form a difunctional stabilizer, whereas the coupling of a difunctional polyether with a trifunctional coupling agent will form a trifunctional stabilizer.

Exemplary coupling agents include polycarboxylic acids such as phthalic acid and terephthalic acid as well as the corresponding acid chlorides and alkyl esters thereof. Also suitable are relatively low molecular weight (2000 or less, preferably 1000 or less), 2 to 4-functional, preferably difunctional, epoxy resins such as glycidyl ethers of bisphenols. Preferred coupling agents include polyisocyanates such as are described hereinafter. Diisocyanates such as toluene diisocyanate (TDI), diphenylmethane diisocyanate (MDI), MDI derivatives and the like are more preferred on the basis of cost and ease of use in coupling the polyethers.

The coupling reaction is readily completed by forming a mixture of the coupling agent and polyether under conditions such that the coupling reaction occurs. Typically, mild heating can be employed to accelerate the reaction, as well the the use of appropriate catalysts. The formation of esters from polyethers and epoxy resins, for example, is easily done under mild conditions using a suitable catalyst such as a $BF_3$ etherate. The coupling of polyethers with isocyanate compounds is advantageously conducted as described, for example, in U.S. Pat. No. 4,546,122. In coupling the polyether, the relative amounts of polyether and coupling agent are chosen so that the coupled polyether has a molecular weight as described before. Less than a stoichiometric amount of coupling agent is used, but the precise amount required in any case will depend on the molecular weight of the polyether, as the lower the molecular weight of the polyether, the more coupling will be necessary to obtain the required molecular weight for the stabilizer.

Good results typically obtained by using the coupling agent at an index (defined as 100 times the equivalents of coupling agent divided by equivalents of polyol) of about 60, preferably about 65, more preferably about 75, to about 90, preferably about 85. A higher index leads to the formation of a higher equivalent weight coupled polyol.

In the preparation of polyethers through the polymerization of alkylene oxides, or through the coupling procedure described before, terminal hydroxyl groups are formed. Since the stabilizer of this invention has up to about 1.0 hydroxyl group/molecule, it is necessary to cap off a substantial amount of the hydroxyl groups and replace them with polymerizable ethylenically unsaturated groups. This is conveniently done by reacting the hydroxyl-terminated polyether with a capping agents which is a difunctional compound having a vinyl group and a coreactive group which reacts with the hydroxyl group to form a bond to the polyether. Unsaturated isocyanates, carboxylic acids, carboxylic acid chlorides, carboxylic acid anhydrides and epoxies are suitable. Unsaturated isocyanates such as isocyanatoethylmethacrylate and $\alpha,\alpha$-dimethyl metaisopropenyl benzylisocyanate (TMI) are preferred. The preparation of such capped polyethers is described, for example, in U.S. Pat. Nos. 3,931,450 and 4,390,645, incorporated herein by reference. In this invention, sufficient of the hydroxyl groups are reacted so that the resulting stabilizer has an average number of hydroxyl groups/molecule as described before. If desired, essentially all of the hydroxyl groups may be reacted so that the stabilizer contains essentially no free hydroxyls.

One advantage of the present invention is that the stabilizers are more efficient than conventional stabilizers. This means that stable polymer polyols can be prepared using less of the more expensive raw materials such as, for example, TMI. The polyols of the present invention are prepared with from about 0.1 to about 0.01, to preferably from about 0.09 to about 0.02 and more preferably from about 0.08 to about 0.03 percent capping agent based on total polymer polyol.

The most preferred stabilizers are prepared by reacting a 1000 to 6000 equivalent weight polymer of propylene oxide or copolymer of propylene oxide and ethylene oxide with a diisocyanate at an index of about 65 to about 85, especially about 75 to about 85, to form a hydroxyl-terminated oligomer and then capping at least about 50 percent of the remaining hydroxyl groups with a difunctional compound as described above.

A polymer polyol is made according to this invention by polymerizing at least one ethylenically unsaturated monomer in a continuous polyol phase in the presence of an effective amount of the stabilizer described above. The base polyol which comprises the continuous phase of the dispersion is a material having on average a plurality of isocyanate-reactive groups per molecule. A wide variety of such polyols are known to be used in preparing polymer polyols, including those described in columns 3–5 of U.S. Pat. No. 4,394,491, incorporated herein by reference. However, preferred polyols for preparing flexible foams and other elastomeric polyurethanes are polyether and polyester polyols having an equivalent weight from about 500 to about 8,000, preferably about 800 to about 3000, more preferably about 1000 to about 2500. These preferred polyether and polyester polyols also advantageously have a nominal functionality from about 2 to about 6, preferably about 2 to about 4, more preferably about 2 to about 3. Particularly preferred are the polyether polyols which are polymers of a $C_2$–$C_4$ alkylene oxide or tetrahydrofuran, especially polymers of propylene oxide which may be random copolymerized or block polymerized with up to about 20 weight percent, based on the weight of the total, of ethylene oxide. Most preferred for use in making molded or high resiliency slabstock foam are nominally trifunctional polymers of propylene oxide having about 8–20 weight percent ethylene oxide end-capping Most preferred for conventional slabstock foam are nominally trifunctional polymers of propylene oxide and random copolymers of propylene oxide with up to about 15 weight percent ethylene oxide.

For preparing rigid foams, polyethers having an equivalent weight from about 85 to abut 500 and an average functionality of about 2 to about 8, preferably about 3 to about 6 hydroxyl groups/molecule are preferred.

The ethylenically unsaturated monomers useful herein are compounds having ethylenically polymerizable unsaturation, other than stabilizer compounds. Suitable such monomers are disclosed in U.S. Pat. No. 4,581,418, incorporated herein by reference. These include aliphatic conjugated dienes such as butadiene; monovinylidene aromatics such as styrene, a-methyl styrene and vinylnaphthylene, including other inertly substituted styrenes; $\alpha,\beta$-ethylenically unsaturated carboxylic acids and esters such as acrylic acid, methacrylic acid, methyl methacrylate, 2-hydroxyethylacrylate and the like; $\alpha,\beta$-ethylenically unsaturated nitriles such as acrylonitrile; acrylamide; vinyl esters such as vinyl acetate, vinyl ethers, vinyl ketones, vinyl and vinylidene halides, and the like. Of these, the monovinylaromatics and the $\alpha,\beta$-unsaturated nitriles are preferred, with mixtures of styrene and the $\alpha,\beta$-unsaturated nitriles being especially preferred. Most preferred are mixtures of styrene and acrylonitrile in a weight ratio from about 25:75 to about 95:5.

The amount of monomers is not especially critical, provided a stable dispersion is prepared. Thus a % solids of from about 1, preferably about 10, more preferably about 20, to about 60, preferably about 50, more preferably about 45 percent of the weight of the dispersion can be used. In this invention, the "solids" is considered to be equal to the weight of the ethylenically unsaturated monomers used in preparing the dispersion. If a seeding process is used, as discussed below, the "solids" is considered to be equal to the sum of the weight of the ethylenically unsaturated monomers used in preparing the seed dispersion and those used in preparing the product dispersion.

The process is conducted by combining the ethylenically unsaturated monomers with the base polyol in the presence of the stabilizer, under conditions such that the monomers polymerize to form a plurality of discrete polymer particles dispersed in the base polyol. Advantageously, such conditions include an elevated temperature and agitation. Temperatures from about 20 to about 150, preferably about 80 to about 130, more preferably about 105 to about 125° C. are usually suitable, depending somewhat on the particular monomers and free radical initiators employed. In addition, the reaction mixture is preferably agitated during the process in order to facilitate the formation of discrete polymer particles.

Although it is possible to add all components to the reaction vessel at the start of the reaction, it is usually preferred to stage the addition of monomers, and more preferred to stage the addition of stabilizer, free radical initiator, and sometimes base polyol as well. The staged addition of these components provides better control of reaction temperatures and provides for a more stable product with a more uniform particle size. In such staged addition process, a small quantity of base polyol, stabilizer, and optionally a seed dispersion are placed in the reaction vessel and heated to the desired polymerization temperature. Then, a monomer stream is added to the reaction vessel under reaction conditions over a suitable period, as described, for example, in U.S. Pat. No. 4,460,715, incorporated herein by reference. Typically, the addition of monomer stream is conducted over a period of about 5 minutes to about 5 hours, preferably about 15 minutes to about 2 hours, more preferably about 30 to about 90 minutes. A stabilizer stream is also preferably added over a similar period, although it is most preferred to add the stabilizer stream at a rate roughly proportional to the rate of growth of the surface area of the dispersed particles, as described in copending application Ser. No. 503,210, filed Apr. 2, 1990 now abandoned. In addition, it is preferred to add free radical initiator at approximately the same time as the monomer stream, although in a separate stream so the polymerization of the monomers does not occur in any significant amount until the monomers have migrated to the dispersed particles. The free radical initiator and stabilizer are advantageously added as solutions in the base polyol.

Following the addition of all streams, it is usually advantageous to maintain the mixture at an elevated temperature for a suitable period in order to ensure essentially complete reaction of the monomers. Generally, such additional heating is continued for about 5 minutes to about 2 hours, preferably about 5 minutes to about 1 hour following the completion of all streams.

It is also preferable to conduct the reaction under an inert atmosphere such as nitrogen or argon, especially if a slight (up to 100 psig) positive pressure thereof is used. This has been found to improve the consistency and filterability of the product.

As mentioned before, a seed dispersion is used in the most preferred embodiment. The seed dispersion preferably has dispersed particles of a vinyl polymer in which the monomers of the monomer stream are more soluble than in the continuous phase. The dispersed seed particles most preferably are polymers of the same monomers which are used to prepare the product dispersion. The seed dispersion advantageously has a solids content of about 5 to about 50%, preferably about 10 to about 40%, more preferably about 20 to about 30%. The seed particles have an average particle size of at least about 30 nanometers (nm), preferably about 50 to about 200 nm and more preferably about 50 to about 150 nm.

The relative proportions of continuous phase, stabilizer, monomers and other components depends somewhat on the particular materials used and the desired attributes and uses for the product dispersion. The amount of stabilizer is chosen so that a stable dispersion is obtained with minimal agglomeration of particles. It is believed that the stabilizer performs at least two separate functions in the preparation of the dispersion. First, it aids in the nucleation of the particles. In addition, it stabilizes the particles against agglomeration and settling. This stabilizer is effective in performing both of these functions. However, in some instances as in the preferred seeding technique, the nucleation of particles is conducted separately from subsequent particle growth. In such cases, the stabilizer used in this nucleation step may be that of this invention, but is not necessarily so. In instances where a different stabilizer is used in the nucleation step, the stabilizer of this invention is used in the particle growth step. It is preferred to use the stabilizer of this invention in the nucleation step, when a separate nucleation step is conducted. When the nucleation and growth of particles are not conducted separately, the stabilizer is that of this invention.

A major advantage of this invention is the efficiency of the stabilizer, resulting in very good results at very low levels of use. The stabilizer of this invention has been found to be effective when used in an amount from about 0.1 to about 10, preferably about 0.5 to about 3, more preferably about 0.5 to about 1.5% of the weight of the polymer polyol.

As mentioned before, it is normally desirable to add a free radical initiator to the reaction mixture during the polymerization process. Sufficient free radical initiator is used to provide a commercially acceptable polymerization rate. Typically, the free radical initiator is used in an amount from about 0.1 to about 1.75, preferably about 0.2 to about 1, more preferably about 0.25 to about 0.8%, based on the weight of the monomers. Included among these initiators are peroxyesters, peroxides, persulfates, perborates percarbonates, azo compounds and the like. Examples of such catalysts include hydrogen peroxide, t-butylperoctoate, di(t-butyl)peroxide, lauroyl peroxide, cumene hydroperoxide, t-butyl hydroperoxide, 2,2'-azobis [2,4-dimethyl]pentanenitrile, 2-(t-butylazo)-2-methylbutane nitrile, 2-(t-butylazo)-2,4-dimethylpentanenitrile, azobis(isobutyronitrile)azobis (methylbutyronitrile) as well as mixtures of such catalysts. Of the foregoing catalysts, the azo catalysts, especially azobis(isobutyronitrile) and azobis(methylbutyronitrile) are preferred.

Other additives useful in conducting vinyl polymerization reactions are optionally employed in making the product polymer polyol. Notable among these are chain transfer agents, such as are described, for example, in U.S. Pat. No. 4,689,354, incorporated herein by reference. Preferred chain transfer agents include the diverse mercaptans such as tertiary dodecyl mercaptan, α-toluenethiol, 1-tetradecanethiol, 2-octanethiol, 1-heptanethiol, 1-octanethiol, 2-naphthalenethiol, 1-naphthalenethiol, 1-hexanethiol, ethanethiol, 1-dodecanethiol, benzyl sulfide, iodoform, iodine and the like. The use of the chain transfer agent has been found in some cases to improve the stability and filterability of the product polymer polyol, particularly when used in an amount from about 0.1 to about 5, preferably about 0.25 to about 2.5, most preferably about 0.5 to about 1.0% based on the weight of the vinyl monomers.

The resulting product is a dispersion of a vinyl polymer in a polyol, having a % solids as described before. The dispersed vinyl polymer particles tend to have a narrow particle size distribution, compared to those made in most prior art processes. The average particle size is advantageously about 150 to about 2000, preferably about 200 to about 1000, more preferably about 300 to about 600 nm. The viscosity of the dispersion depends to a significant extend on the % solids and the composition of the continuous phase, but is preferably not in excess of about 12,000 cks, more preferably less than about 8,000 cks and most preferably less than about 5,000 cks.

The product polymer polyol is useful in the preparation of polyurethanes, as described, for example, in U.S. Pat. Nos. 4,390,645 and 4,689,354. The type of polyurethane for which the polymer polyol is most suited will depend to a great extent on the functionality and equivalent weight of the polyol which forms the continuous phase. In general, low equivalent weight (less than about 500, preferably less than about 300), high functionality polymer polyols are particularly useful in preparing rigid polyurethane foams, as crosslinkers for elastomeric polyurethanes and in preparing structural polymers. Higher equivalent weight polymer polyols having a functionality from about 2 to about 4 are particularly useful for preparing flexible polyurethane foams and in forming the soft segment of non-cellular or microcellular polyurethane elastomers.

The product polymer polyol is especially suitable for preparing elastomeric polyurethanes, such as thermoplastic elastomers and especially flexible polyurethane foam. In preparing such foam, the polymer polyol is reacted with a polyisocyanate in the presence of a blowing agent. Additional isocyanate-reactive materials may also be present, as well as auxiliary agents such as surfactants, catalysts, colorants, antioxidants, fillers, mold release agents and the like.

The polyisocyanate is an organic compound having an average of at least two isocyanate groups per molecule. Aromatic and aliphatic polyisocyanates are useful to make foam, but aromatic polyisocyanates are highly preferred due to their availability and cost. Such polyisocyanates include m-phenylene diisocyanate, 2,4- and/or 2,6- toluene diisocyanate (TDI), hexamethylene-1,6-diisocyanate, 2,4'- and/or 4,4'-diphenylmethane diisocyanate (MDI), polymethylene polyphenylpolyisocyanates (PMDI), hydrogenated MDI or PMDI, cyclohexane-1,4-diisocyanate, tetramethylene -1,4-diisocyanate, naphthylene-1,5-diisocyanate, 1-methoxyphenyl-2,4-diisocyanate, 4,4'-biphenylene diisocyanate, 3,3'-dimethyl- 4,4'-biphenyl diisocyanate, toluene-2,4,6-triisocyanate and the like. TDI, MDI and PMDI are prefer re d. Also useful are prepolymers of the foregoing as well as derivatives of the foregoing which contain carbodiimide, allophonate or biuret linkages.

Blowing agents, for the purposes of this invention, include any material which generates a gas under the conditions of the reaction of the polymer polyol with a polyisocyanate. Watery the diverse low boiling hydrocarbons and halogenated hydrocarbons, the so-called azo compounds which release nitrogen and similar materials are suitable. Suitable hydrocarbons and halogenated hydrocarbons include pentane, hexane, heptane, pentene and heptene, dichlorodifluoromethane, trichlorofluoromethane, dichlorodifluoromethane, 1,1,1-trichloroethane and methylene chloride. Water and mixtures thereof with low boiling hydrocarbons and halogenated hydrocarbons are preferred.

It is often desirable to dilute the polymer polyol with another polyol in preparing foam, especially when the % solids of the polymer polyol exceed about 20% by weight. The polyol suitable for this purpose depends on the desired properties of the polyurethane, and in making flexible foamy those having equivalent weights from about 1000 to about 2500 and an average functionality from about 2 to about 4 are preferred. The other polyol is also advantageously compatible with that forming the continuous phase of the polymer polyol. It is normally desirable to use sufficient of this other polyol so that the % solids of the mixture of this polyols and the polymer polyol is about 2 to about 30, preferably about 5 to about 20%.

Catalysts are also normally used in making polyurethanes and are preferred. The two major types of catalysts used are the tertiary amines and the organometallic catalysts. Exemplary tertiary amine catalysts include, for example, triethylene diamine, N-methyl morpholine, N-ethyl morpholine, diethylethanolamine, N-coco morpholine, 1-methyl,4-dimethylaminoethyl piperazine, 3-methoxy-N-dimethylpropyl amine, bis(N,N-dimethylaminoethyl)ether and the like. Tertiary amine catalysts are usually used in an amount from about 0.1 to about 5, preferably about 0.2 to about 2 parts per 100 parts of polyol (including polymer polyol). Suitable organometallic catalysts include organolead, organoiron, organomercury, organobismuth and preferably organotin compounds. Exemplary organotin compounds include dibutyltin-dilaurate, dimethyltindilaurate, stannous octoate, stannous chloride and the like. Organometallic catalysts are usually used in an amount from about 0.001 to about 0.5, preferably about 0.05 to about 0.2 parts per 100 parts of polyol (including polymer polyol).

A surfactant is also advantageously used in preparing foam, in order to stabilize the reaction mixture against cell collapse until it is sufficiently cured to maintain its cellular configuration. Suitable surfactants include silicone surfactants, most of which are block copolymers containing at least one poly(oxyalkylene) segment and one poly(dimethylsiloxane) segment. Other surfactants include polyethylene glycol ethers of long chain alcohols, tertiary amine or alkanolamine salts of long chain alkyl acid sulfate ester, alkyl sulfonic esters and alkyl arylsulfonic acids. When used, about 0.1 to about 3, preferably about 0.3 to about 1 part by weight surfactant per 100 parts of polyol (including polymer polyol) is normally adequate.

In addition, crosslinkers like diethanolamine, methylene bis(o-chloroaniline) and the like, chain extenders such as α,ω-alkylene glycols and glycol ethers and aromatic diamines, colorants, preservatives, fillers and the like may be employed in the formulation. The use of crosslinkers and chain extenders to modify the processability and properties of the foam is well known in the art.

The foam may be made in a molding or free rise process. In making molded foam, the reaction mixture is introduced into a mold in which it reacts and expands, filling the mold and thereby assuming the shape of the interior of the mold. In making free rise or slabstock foam, the reaction mixture is permitted to rise freely against the force of gravity. Both the molding and free rise process are well known and described, for example in U.S. Pat. No. 4,485,133.

The resulting foams are useful for a wide range of cushioning and energy-absorbing applications, such as automobile car seats, arm rests and dashboards, packaging, bedding, carpet underlay, and the like.

In another embodiment, the present invention is, in a process for preparing a polymer polyol wherein at least one ethylenically unsaturated monomer is polymerized in the presence of an effective amount of a conventional stabilizer to form a dispersion of particles in the continuous polyol phase and wherein the stabilizer is a partially capped triol, the improvement comprising substituting a more efficient stabilizer for the conventional stabilizer, the more efficient stabilizer being a stabilizer prepared from a formulation including a low molecular weight diol, a coupling agent and a capping agent; and wherein the stabilizer is a polymer having: terminal polymerizable ethylenically unsaturation; an average molecular weight of from about 6,000 to about 100,000; an average hydroxyl functionality of up to about 1.0 hydroxyl groups per molecule; and is present at a from about 0.1 to about 10 percent of the weight of the polymer polyol. Preferably, the coupling agent is TDI or MDI. Also preferably, the capping agent is TMI.

ILLUSTRATIVE EMBODIMENTS

The following examples are given to illustrate the invention and should not be interpreted as limiting it in any way. Unless stated otherwise, all parts and percentages are given by weight.

EXAMPLE 1

A. Preparation of Stabilizers

Stabilizer A is prepared by reacting a 4000 molecular weighty nominally difunctional, ethylene oxide-capped poly(propylene oxide) with toluene diisocyanate at a 65 index. This reaction is carried out by mixing the TDI with the diol and heating to about 90° C. for about 2 hours in the presence of a catalytic amount of dibutyltindilaurate. To the resulting product is added 0.3 equivalent of α-dimethyl meta-isopropenyl benzyl isocyanate (TMI™, a product of American Cyanamid Corporation) per equivalent of diol initially charged. That mixture is permitted to react for 4 hours at 90° C. The resulting stabilizer (Stabilizer A) has a number average molecular weight ($M_n$) of about 8000–12000. The average hydroxyl functionality of Stabilizer A is less than about 0.3 OH group/molecule.

Stabilizer B is prepared in like manner, except TDI is used at a 75 index and 0.2 equivalent of TMI™ isocyanate is used per equivalent of starting diol. The resulting Stabilizer B has an $M_n$ of about 9000–15000 and an average hydroxyl functionality of less than about 0.5 OH group/molecule.

Stabilizer C is prepared in like manner, except TDI is used at a 85 index and 0.1 equivalent of TMI™ isocyanate is used per equivalent of starting diol. The resulting Stabilizer C has an $M_n$ of about 10000–20000 and an average hydroxyl functionality of less than about 0.7 OH group/molecule.

Stabilizer D is prepared using the same relative amounts of materials as Stabilizer B, but is prepared by simultaneously mixing and reacting the diol, TDI and TMI™ isocyanate. The properties of Stabilizer D are substantially the same as those of Stabilizer B.

B. Preparation of Copolymer Polyols Using Seed Copolymer Polyol Having Particles Nucleated with a Conventional Stabilizer In a suitable vessel are placed 313 parts of a 25% solids 70/30 S/AN seed dispersion in Polyol A. The particles of the seed dispersion have a median diameter of about 90 nm. Polyol A is a 1600 equivalent weight, nominally trifunctional poly(propylene oxide) end-capped with ethylene oxide. The seed dispersion also contains 40.6% of a conventional stabilizer, which is prepared by reacting TMI™ isocyanate with a 1600 equivalent weight, nominally trifunctional random copolymer of 87% PO and 13% EO, at a mole ratio of 0.2:1. To the vessel are added 5110 parts of Polyol A and 40 parts of Stabilizer A. The resulting mixture is heated to 125° C. under a nitrogen blanket with agitation. While maintaining the temperature of the mixture at about 125° C., several streams are fed into the vessel. One stream is an acrylonitrile stream, which is fed at a rate of 26.32 parts/minute for 57 minutes. Beginning two minutes after the acrylonitrile stream, a styrene stream is fed at a rate of 63.6 parts/minute for 55 minutes. A mixture containing 16% Stabilizer A in Polyol A is fed, beginning at the same time as the styrene stream, for 10 minutes at an initial rate of 67.5 parts/minute, for 10 more minutes at 42.8 parts/minute, and for 34 more minutes at 35.9 parts/minute. Beginning simultaneously with the acrylonitrile stream a mixture of 0.85% azobis(2-methylbutyronitrile) in Polyol A is fed to the vessel for 57 minutes at a rate of 39.6 parts/minute and then for 43 more minutes at a rate of 90.7 parts/minute. Also beginning simultaneously with the styrene stream a mixture of 3.3% dodecylmercaptan in Polyol A is fed to the vessel for 55 minutes at a rate of 27.5 parts/minute. Following addition of all streams, the mixture is maintained at 125° C. and stripped under vacuum to remove volatile materials. The resulting product is designated Copolymer Polyol Sample 1-A. The overall amount of Stabilizer A in this Sample is 2%. Sample 1-A is a smooth, high quality dispersion containing 25% solids. Its viscosity at 25° C. is 2500 cks and the median particle size is 360 nm. This particle size is unexpectedly small, and is attributed to a substantial reduction in the agglomeration of the particles in the early stages of the polymerization due to the efficiency of the stabilizer. Using 12.5% of a conventional stabilizer such as that used in preparing the seed particles, a median particle size of about 500 nm is expected. Thus, this stabilizer gives an improved performance at a vastly reduced level of use.

Another copolymer (Sample No. 1-B) polyol sample is made in the same manner, except that the level of stabilizer is reduced to 1.5%. Very similar results are obtained, and the viscosity and particle size are the same as Sample 1-A within experimental error.

Because the median particle size of the product copolymer varies inversely with the amount of seed, it is attempted to prepare a copolymer polyol having a median particle size of 500 nm using the same procedure as described for Sample 1-A, except the amount of seed was reduced to 120 parts. The resulting copolymer polyol (Sample 1-C) has a viscosity of 2160 cks and a median particle size of 490 nm. This procedure is again repeated to produce Sample 1-D, except the amount of Stabilizer is reduced to 1%. Excellent results are again obtained, as the product has a viscosity of 2410 cks and a median particle size of 510 nm.

Another copolymer polyol (Sample 1-E) is prepared as Sample 1-C, except Stabilizer B replaces Stabilizer A. Sample 1-E has a viscosity of 2540 cks and a median particle size of 4567. Substantially the same results are obtained when the level of Stabilizer B is reduced to 0.5%, or when 0.5% of Stabilizer D is used instead. A copolymer polyol (Sample 1-F) prepared with 0.25% Stabilizer B, but otherwise the same way as Sample 1-E, has a viscosity of 2270 cks and a median particle size of 630 nm. Thus, the stabilizer of this invention is effective in stabilizing the dispersion even at very low levels of use.

The procedure of Sample 1-A is repeated, this time substituting 0.25% Stabilizer C for the Stabilizer A. The resulting copolymer polyol (Sample 1-G) has a viscosity of 2030 cks and a median particle size of 520 nm, and is of excellent quality.

C. Nucleation of Copolymer Polyol Particles with Stabilizer of this Invention.

Into a suitable vessel are charged a 6659 parts of a 16% solution of Stabilizer B in Polyol A. This solution is heated to 125° C., and maintained at that temperature, with agitation and under a nitrogen blanket, while several feed streams are added. An acrylonitrile stream is fed at a rate of 26.32 parts/minute for 57 minutes. Beginning two minutes after the start of the acrylonitrile stream, a styrene stream is fed for 55 minutes at a rate of 63.6 parts/minute. Beginning 7 minutes after the start of the acrylonitrile stream, a solution of 16 percent Stabilizer B in Polyol A is added at a rate of 29.64 parts/minute. A slurry of 1.77% azobis (2-methylbutyronitrile) in Polyol A is added, beginning simultaneously with the start of the acrylonitrile stream, for 59 minutes at an initial rate of 86.7 parts/minute and for 43 additional minutes a the rate of 45.5 parts/minute. Following the addition of all streams, the mixture is stripped under vacuum to remove volatile materials. The product is a 25% solids dispersion having a viscosity of 5660 cks and a median particle size of 110 nm.

This dispersion (Seed Dispersion A) is used as a seed dispersion to prepare a product copolymer polyol. Copolymer polyol Sample 1-H is made in the same manner as Sample 1-A, except 213 parts of Seed Dispersion A replaces the seed copolymer polyol used in preparing Sample 1-A, and the level of Stabilizer B added is 0.5%. The product is a smooth, stable dispersion having a viscosity of 2370 cks and a median particle size of 490 nm.

EXAMPLE 2

A. Preparation of Stabilizers E–J

Stabilizer E is prepared in the same general manner as Stabilizer A, except TDI is used at a 60 index and 0.25 equivalent of TMI℧ isocyanate is used/equivalent of starting diol. Stabilizer E has an $M_n$ of about 7900–8550 and an average of about 0.75 OH group/molecule.

Stabilizer F is prepared in the same general manner as Stabilizer A, except (1) a 4000 MW, nominally difunctional poly(propylene oxide) is substituted for the capped diol used in preparing Stabilizer A, the TDI index is 60, and (3) 0.35 equivalent of TMI™ isocyanate is used per equivalent of starting diol. Stabilizer F has an $M_n$ of about 10,100 and contains about 0.25 OH group/molecule.

Stabilizer G is prepared in the same manner as Stabilizer F, except the TDI index is 65 and 0.2 equivalent of TMI™ isocyanate is used per equivalent of starting diol. Stabilizer G has an $M_n$ of about 8900 and contains about 0.85 OH group/molecule.

Stabilizer H is prepared in the same manner as Stabilizer E, except that a 143 equivalent weight carbodiimide-modified "liquid MDI" is substituted for the TDI used in making Stabilizer E. Stabilizer H has an $M_n$ of about 9600 and an average of about 0.75 OH group/molecule.

Stabilizer I is prepared in the same manner as Stabilizer E, except that pure diphenylmethane diisocyanate (MDI) is substituted for the TDI used in making Stabilizer E. Stabilizer H has an $M_n$ of about 7600 and an average of about 0.75 OH group/molecule.

Stabilizer J is prepared in the same general manner as Stabilizer I, except the MDI index is 85 and 0.1 equivalent of TMI™ isocyanate is used per equivalent of starting diol. Stabilizer J has an $M_n$ of about 13,500 and contains about 0.7 OH group/molecule.

B. Preparation of Copolymer Polyols 2-A through 2-G

Copolymer Polyol Sample 2-A is prepared using the following general procedure. Into an appropriate vessel are charged 372.5 parts of Polyol B, a 1000 equivalent weighty nominally trifunctional random copolymer of a mixture of 92% PO and 8% EO and 27.5 parts of Stabilizer B. The vessel's contents are then heated to 125° C. with stirring. An initiator slurry of 7.7 parts azobis (2-methylbutyronitrile) in 675 parts Polyol B is prepared, and fed to the reaction vessel at an initial rate of 1.13 parts/minute. A stabilizer mixture containing 327.5 parts Polyol B and 22.5 parts Stabilizer B is fed to the reaction vessel at an initial rate of 0.58 parts/minute, beginning one minute after the initiator slurry feed stream begins. Beginning at the same time as the stabilizer mixture feed stream, a monomer mixture containing 752.5 parts styrene, 322.5 parts acrylonitrile and 8.1 parts dodecyl mercaptan is added at an initial rate of 1.81 parts/minute. All feed streams are added while maintaining the temperature of the vessel's contents at 125° C. One hour after the feed of the monomer mixture and stabilizer mixture, the feed rates for each stream is increased, so that the remaining stabilizer mixture is added over 45 minutes, the remaining monomer mixture is added over 60 minutes and the remaining initiator slurry is added over 90 minutes. After the completion of all feed streams, the vessel's contents are maintained at 125° C. for an additional 30 minutes, and the resulting product is stripped under vacuum to remove volatile impurities. The resulting copolymer polyol has a nominal solids content of 43%. The median particle size is measured by HDC and are as reported in Table 1. Brookfield viscosity of the dispersion is measured and is a reported in Table 1.

Copolymer polyol Samples 2-B through 2-G are made in the same manner as Sample 2-A, except for the choice of stabilizer. The stabilizer used is as indicated in Table 1. Viscosity and particle size properties are also as indicated in Table 1.

TABLE 1

| Copolymer Polyol Sample | Stabilizer | Viscosity (cks) | Median Particle Size (nm) |
|---|---|---|---|
| 2-A | E | 5750 | 700 |
| 2-B | B | 7500 | 560 |
| 2-C | I | 5700 | 670 |
| 2-D | J | 6650 | 850 |
| 2-E | F | 8600 | 550 |
| 2-F | G | 7500 | 650 |
| 2-G | H | 6450 | 670 |

All dispersions are smooth and stable, and are useful for preparing a good quality flexible polyurethane foam. This is particularly surprising due to the low level of stabilizer used. When a conventional stabilizer prepared from a 5000 molecular weight polyether triol and 0.2 mole TMI/mole of triol is used, the amount of stabilizer required to obtain a product of similar quality is three times that used in preparing Samples 2-A through 2-G, based on the amount of induced unsaturation contained in the stabilizer.

C. Polyurethane Foams Prepared from Copolymer Polyol Samples 2-A through 2-G.

A slabstock flexible polyurethane foam is prepared by rapidly mixing at room temperature 100 parts Copolymer Polyol Sample 2-A, 3 parts water, 1 part of a silicone surfactant, 0.083 parts of a tertiary amine catalyst, 0.08 parts of an organotin catalyst and sufficient TDI to provide a 1.15 isocyanate index. The mixture is poured into an open mold and permitted to rise and cure. The resulting foam is designated Sample 2-A, and its physical properties are as reported in Table 3 following. Flexible Polyurethane Foam Samples 2-C through 2-G are prepared in like manner, substituting Copolymer Polyol Samples 2-C through respectively, for Copolymer Polyol 2-A. The physical properties of Foam Samples 2-C and 2-G are determined are are as reported in Table 2. For comparison, a Foam made with a control copolymer polyol prepared with a con-ventional stabilizer as described in Example 2-B is also evaluated.

TABLE 2

| | Foam Number | | | |
|---|---|---|---|---|
| Property | Control | 2-A | 2-C | 2-G |
| Density, pcf | 2.01 | 2.08 | 1.97 | 2.08 |
| Tensile Str., psi | 26.6 | 25.9 | 25.5 | 26.4 |
| Tear Str., pli | 1.9 | 2.0 | 2.0 | 2.0 |
| Elongation, % | 87 | 78 | 86 | 80 |
| Compress. Set, % | 42.4 | 14.9 | 8.6 | 14.5 |
| Resiliency | 23 | 20 | 23 | 18 |
| Air Flow, ft$^3$/min | 2.3 | 2.4 | 3.4 | 2.1 |
| 25% ILD, lb. | 123 | 122 | 109 | 115 |
| 65% ILD, lb. | 233 | 235 | 212 | 223 |
| ret. 25% ILD, lb. | 58 | 62 | 57 | 61 |
| Hysteresis, % | 48 | 51 | 52 | 53 |
| Modulus | 1.90 | 1.93 | 1.95 | 1.94 |
| Load Loss, % | 41 | 31 | 21 | 39 |
| Ht. Loss, % | 3.9 | 4.0 | 3.4 | 3.0 |

From the data in Table 2, it is seen that the properties of the Foam Samples of this invention are quite similar to those of the control except for substantial improvements in Compression Set, and the fatigue properties (Load Loss and Height Loss). In addition, the Foam Samples of this invention cured slightly more slowly, at least at the initial stages of the reaction, indicating that improved processability is provided by the Copolymer Polyol of this invention.

EXAMPLE 3

Stabilizer K is prepared by reacting TDI and a 4500 molecular weight, nominally difunctional poly(ethylene oxide) at a 65 index, and then capping the resulting material with 0.3 equivalent of TMI/equivalent of starting diol, using the general procedure used to prepare Stabilizer A. This stabilizer has a $M_n$ of about 9000–12000 and contains about 0.25 OH group/molecule.

Stabilizer L is prepared in like manner, except a 4000 MW nominally difunctional poly(propylene oxide) is substituted for the poly (EO) diol used to prepare Stabilizer J. This stabilizer has a $M_n$ of about 8000–10,000 and contains about 0.25 OH group/molecule.

A copolymer polyol (Sample 3-A) suitable for producing rigid polyurethane foam is prepared according to the general procedure described in Example 2-B, with several modifications. Stabilizer K is used in place of Stabilizer B. Polyol B is replaced with Polyol C, a 400 molecular weighty nominally trifunctional poly(ethylene oxide). The % solids is 25%. The level of dodecyl mercaptan is 0.75% based on monomers. A stable dispersion is obtained, which crystallizes on cooling. However, on reheating, the solids particles redisperse evenly.

When the foregoing experiment is repeated, substituting Stabilizer A for Stabilizer K, the resulting dispersion is not stable. This is believed to be due to that fact that the diol used in making Stabilizer A has a very large oxypropylene content, which renders it relatively incompatible with Polyol C, an EO homopolymer. Stabilizer K, on the other hand, is made from a homopolymer of ethylene oxide, which is quite miscible with Polyol C. This points out the importance of matching the composition of the stabilizer with that of the base polyol.

Another copolymer polyol is made in the same manner as Sample 3-A, with the following exceptions. Polyol C is replaced with Polyol D, a 400 molecular weight, nominally difunctional poly(PO). Stabilizer L replaces Stabilizer K, and the dodecyl mercaptan level is 3% based on monomers. The solids content is 40%. A stable dispersion is obtained. Similar results are obtained when a duplicate run is made at 45% solids. In addition, stable 45% solids dispersions are made in this manner wherein the ratio of styrene to acrylonitrile is changed to 50:50; 30:70 and 0:100.

EXAMPLE 4

Stabilizer M is made in the same manner as Stabilizer K, except a 2900 molecular weight, nominally difunctional poly(tetramethylene oxide) polymer replaces the diol used in making Stabilizer K.

Stabilizer M is used to make a copolymer polyol (Sample 4-A) according to the general procedure described in Example 2-B, with the following exceptions. Polyol B is replaced with a 2000 molecular weight, nominally difunctional poly(tetramethylene oxide) polymer. Instead of three feed streams, all additions to the reaction vessel except the initial charge are made in a single feed stream, which is fed over a total period of 60 minutes. A stable dispersion is obtained, which solidifies over time due to the crystallization of the continuous polyol phase. It remains stable after remelting. This dispersion is used to prepare a thermoplastic polyurethane which can be subsequently extruded without substantial breakdown of the particles.

Stabilizer M is also used to make another copolymer polyol like Sample 4-A, except the 2000 molecular weight diol is replaced with a 700 molecular weight, nominally difunctional poly(tetramethylene oxide) polymer. A stable dispersion is obtained.

EXAMPLE 5

Stabilizer N is made in the same manner as Stabilizer B, except the polyol used is a 2000 molecular weight, nominally difunctional ethylene oxide-capped poly(propylene oxide). Stabilizer N has an $M_n$ of about 7100 and contains about 0.4 hydroxyl groups/molecule. Copolymer polyol sample 5-A is prepared in the same manner as described in Example 2-B, except Stabilizer N is used in place of Stabilizer B. The resulting dispersion has a viscosity of 5600 cks and a median particle size of 660 nm.

Stabilizer P is made in the same manner as Stabilizer N, except only 0.125 equivalent of TMI™ isocyanate is used per equivalent of starting diol. Stabilizer P has an $M_n$ of about 6900 and contains about 1.0 hydroxyl group/molecule. Copolymer polyol sample 5-B is made in the same manner as sample 5-A, except for the substitution of Stabilizer P. It has a viscosity of 5400 cps and a median particle size of 690 nm.

Stabilizer Q is made in the same manner as Stabilizer N, except 0.25 equivalent of TMI™ isocyanate is used per equivalent of starting diol. Stabilizer P has an $M_n$ of about 7100 and contains essentially zero hydroxyl groups/molecule. Copolymer polyol sample 5-C is made in the same manner as sample 5-A, except for the substitution of Stabilizer Q. It has a viscosity of 8000 cps and a median particle size of 460 nm.

EXAMPLE 6

Stabilizer R is made in the following manner. A 729.3 part portion of a 1910 equivalent weight, nominally difunctional, ethylene oxide-capped poly(propylene oxide) is heated with 51.5 parts of a 180 equivalent weight diglycidyl ether of bisphenol A and 0.2 parts of a $BF_3$ etherate at 50° C. for 2 hours. The resulting coupled polyol is then neutralized with a KOH solution, and heated for two hours at 90° C. with 19.2 parts TMI™ isocyanate and 0.2 part of an organotin catalyst. The resulting Stabilizer R has a molecular weight of about 9000 to 15,000 and an average functionality of about zero hydroxyl groups/molecule.

Copolymer polyol 6-A is made in the same manner as Copolymer polyol 2-A, except Stabilizer R is used. The resulting dispersion has a viscosity of 5000 cks and a median particle size of 530 nm.

What is claimed is:

1. A process for preparing a polymer polyol in which at least one ethylenically unsaturated monomer is polymerized in a continuous polyol phase in the presence of an effective amount of a stabilizer to form a dispersion of particles of a polymer of the ethylenically unsaturated monomer in the continuous polyol phase, characterized in that the stabilizer is a polymer having a terminal polymerizable ethylenic unsaturation; a number average molecular weight of from about 6,000 to about 100,000; an average hydroxyl functionality of up to about 1.0 hydroxyl group/molecule; and is prepared from a low molecular weight diol, a difunctional coupling agent and a capping agent, wherein the stabilizer is present in a concentration of from about 0.1 to about 10 percent of the weight of the polymer polyol.

2. The process of claim 1 wherein the continuous polyol phase is a polyether or mixture of polyethers and the stabilizer is a polyether.

3. The process of claim 2 wherein the stabilizer has a $M_n$ of about 8000 to about 50,000, an average hydroxyl-functionality of no greater than about 0.8 and an overall functionality of about 2.

4. The process of claim 3, wherein the ethylenically unsaturated monomer is a mixture of styrene and acrylonitrile.

5. The process of claim 4, wherein the continuous polyol phase is a polyether which is a polymer of propylene oxide or a copolymer of propylene oxide and ethylene oxide.

6. The process of claim 5 wherein the continuous polyol phase has an average equivalent weight of about 800 to about 3000 and a functionality of about 2 to about 4.

7. The process of claim 6 wherein the copolymer polyol has a percent solids of from about 10 to about 45 weight percent.

8. The process of claim 4 wherein the continuous polyol phase is a poly(propylene oxide) or poly(ethylene oxide) having an average equivalent weight of about 85 to about 500 and an average functionality of about 3 to about 6.

9. The process of claim 3, wherein a seed dispersion is present.

10. The process of claim 9, wherein the seed dispersion contains a stabilizer or reaction product thereof, which stabilizer is a polymer having terminal polymerizable ethylenic unsaturation and a number average molecular weight from about 6000 to about 100,000, and which contains an average hydroxyl functionality of no greater than 1.0 hydroxyl group/molecule.

11. In a process for preparing a polymer polyol wherein at least one ethylenically unsaturated monomer is polymerized in the presence of an effective amount of a conventional stabilizer to form a dispersion of particles in the continuous polyol phase and wherein the stabilizer is a partially capped triol, the improvement comprising substituting a more efficient stabilizer for the conventional stabilizer, the more efficient stabilizer being a stabilizer prepared from a formulation including a low molecular weight diol, a difunctional coupling agent and a capping agent; and wherein the stabilizer is a polymer having: terminal polymerizable ethylenically unsaturation; an average molecular weight of from about 6,000 to about 100,000; an average hydroxyl functionality of up to about 1.0 hydroxyl groups per molecule; and is present at a from about 0.1 to about 10 percent of the weight of the polymer polyol.

12. The process of claim 1 wherein the coupling agent is TDI or MDI.

13. The process of claim 12 wherein the capping agent is TMI.

* * * * *